US006785584B2

(12) United States Patent
Yoshikawa

(10) Patent No.: US 6,785,584 B2
(45) Date of Patent: Aug. 31, 2004

(54) LOADER CONTROL DEVICE

(75) Inventor: Shinji Yoshikawa, Inuyama (JP)

(73) Assignee: Murata Kikai Kabushiki Kaisha, Kyoto (JP)

(*) Notice: Subject to any disclaimer, the term of this patent is extended or adjusted under 35 U.S.C. 154(b) by 316 days.

(21) Appl. No.: 09/988,190

(22) Filed: Nov. 19, 2001

(65) Prior Publication Data

US 2002/0091461 A1 Jul. 11, 2002

(30) Foreign Application Priority Data

Dec. 19, 2000 (JP) ........................................ 2000-385331

(51) Int. Cl.[7] .............................................. G05B 13/00
(52) U.S. Cl. ........................ 700/114; 700/173; 700/192
(58) Field of Search ................................. 700/114, 159, 700/173, 174, 177, 192, 193, 253, 254, 261, 302

(56) References Cited

U.S. PATENT DOCUMENTS 5,436,845 A * 7/1995 Takahashi .............. 364/474.21
5,742,138 A * 4/1998 Kato et al. ............. 318/568.18
6,222,338 B1 * 4/2001 Villaret .................. 318/568.13
6,316,903 B1 * 11/2001 Shamoto ..................... 318/700

FOREIGN PATENT DOCUMENTS

| JP | 6238541 | * 8/1994 | ............ B23Q/7/04 |
| JP | 11239945 | * 9/1999 | ............ B23Q/7/04 |

* cited by examiner

Primary Examiner—Leo Picard
Assistant Examiner—Sean Shechtman
(74) Attorney, Agent, or Firm—Westerman, Hattori, Daniels & Adrian, LLP

(57) ABSTRACT

The present invention relates to a loader control device 20 for controlling a loader 5 which delivers a work W to a chuck 2 of an outer device 1. The work W is delivered by the loader chuck 14 placed at a work delivering position. The displacement of a center position of the loader chuck 14 and the center position of the outer device chuck 2 at the time being is detected by the displaced amount detecting device 31 from the torque of the motors 11 and 12 of the loader 5. The adjusting device 32 adjusts the work delivering position of the loader chuck 14 by an amount corresponding to the detected displaced amount, when delivering the next work.

3 Claims, 4 Drawing Sheets

LOADER CONTROL DEVICE

FIELD OF THE INVENTION

The present invention relates to a loader control device for controlling a loader which carries out a delivery of works to an outer machine such as machine tools.

BACKGROUND OF THE INVENTION

According to an automatic machine tool of NC lathe or the like, a loader is attached to the machine tool main body, and the work is transported in and out automatically. In the loader of gantry loader or the like, there are several important locating positions during the operation of a series of a cycle. For example:

a. load/unload position to the spindle chuck, b. load/unload position to the work reversing machine, c. delivering position between other transporting device.

Generally, the setting of these positions are carried out by a professional operator in advance to the starting of mass production, by a so-called work, "instruction", and is handled as a fixed position during mass production.

However, during mass production, there are cases in which the locating fails even by forcibly appointing to the position by using the fixed value, due to various changes in the condition, such as a mechanic saccadic movement, deterioration of the mechanism parts, and changes in the material differentiation. For example, there are cases in which it leads to a breakdown or an accident wherein it proceeds to processing under impossible posture wherein defective articles are produced, and a work falls off from the chuck or the like during processing. In some cases, the breakdown can be prevented beforehand by stopping the abnormal load alarm of the loader axis, and defects generate in that the operating rate decreases.

It is thus an object of the present invention to provide a loader control device capable of preventing the generation of abnormal operation of the loader or the delivery mistakes due to the core displacement of the chuck when delivering a work to the chuck of an outer device.

It is another object of the present invention to facilitate the adjustment of the work delivering position just by changing the coordinates.

It is still a further object of the present invention to prevent the abnormality reflecting on the next processing when an abnormality generates.

SUMMARY OF THE INVENTION

The present invention will now be described in reference to FIG. 1 which corresponds to the embodiment. A loader control device is a loader control device 20 for controlling a loader 5 which delivers a work W to a chuck 2 of an outer device 1. Moreover, the loader control device comprises a displaced amount detecting means 31 and an adjusting means 32. The displaced amount detecting means 31 detects by the torque of the motors 11, 12 of the loader 5, the displacement of a center position of a loader chuck 14 and a center position of the chuck 2 of the outer device 1, when a work W is delivered with the loader chuck 14 placed on the work delivering position. The adjusting means 32 adjusts the work delivering position of the loader chuck 14 by an amount corresponding to the detected displaced amount when delivering the next work W.

According to this structure, the position of the loader chuck 14 is fixed to the work delivering position instructed beforehand, and the work W is delivered to the chuck 2 of the outer device 1. When the work W is held by the chuck 2 of the outer device 1 and becomes under a restricted state, in the case a displacement has occurred between the center position of the loader chuck 14 and the center position of the chuck 2 of the outer device 1, the torque of the motors 11, 12 for transferring the chuck position of the loader 5 increases. The displaced amount detecting means 31 detects the displacement of the center position of the loader chuck 14 and the center position of the chuck 14 of the outer device 1, by the torque under the restricted state. The adjusting means 32 adjusts the work delivering position of the loader chuck 14 by the amount corresponding to the displaced amount detected by the displaced amount detecting means 31 when delivering the next work W. Therefore, even when a displacement is generated in the appropriate work delivering position due to various changing factors from the time the work delivering position is instructed, the work W can be delivered by adjusting the displacement constantly. As a result, the abnormal operation of the loader or the delivering failure due to the displacement in the core of the chucks 2, 14 can be prevented from generating. Further, the adjusting amount can be the same as the displaced amount or can be in a predetermined ratio to the displaced amount.

Moreover, the outer device 1 mentioned here is a device different from the loader 5, and for example, when the loader 5 is embedded inside the machine tool of the lathe or the like, the outer device 1 can be a section other than the loader in the machine tool. The chuck 2 of the outer device 1 is a chuck of the device delivered with a work W from the loader 5.

According to the present invention, the loader 5 operates by the coordinate data of the work delivering position appointed by the loader program 21, and can carry out an adjustment of the work delivering position by either rewriting the coordinate data or adding revised amount based on aforementioned displaced amount. The specification of the work delivering position by the loader program 21 is carried out by the identifying code ①, ②, ③ . . . of the work delivering position, and the coordinate data corresponding to the identifying code can be stored in the locating position setting means 23, and the work delivering position can be specified by the coordinate data directly to the loader program 21.

In either case, based on the detected displaced amount, by rewriting the coordinate data or by adding the revised amount, the adjusting of the work delivering position can be carried out easily. When storing the coordinate data to the locating position setting means 23, the rewriting of the coordinate data based on the displaced amount is to be for example, rewriting the stored coordinate data itself. When writing the coordinate data to the processing program 21, for example, the coordinate data of the processing program 21 is to be rewritten. When adding the revised amount based on the displaced amount, for example, revising can be added when outputting the operational command by the coordinate data set in the locating position setting means 23 or in the processing program.

According to the present invention, when the torque of the motors 11, 12 is larger than the set value, a processing means during excess load 33 for stopping the adjustment of the delivering position by the adjusting means 32 can be provided.

When the torque of the motors 11, 12 is excessive, it can be assumed that some abnormality, exceeding tolerance level, has occurred. In such case, the adjustment of the delivering position by the adjusting means 32 is stopped, and the abnormality in the adjustment is prevented by the processing means during excess load 33. The judgment whether or not the torque of the motor is larger than the set value can be carried out after converting the torque of the motor into the displaced amount. Moreover, the process to stop the adjustment by the adjusting means 32 can be made not to carry out the adjusting process accordingly, by stopping the displaced amount being input to the adjusting means 32.

Further, according to the present invention, a correlation setting means 34 which sets the correlation of the motor torque and the displaced amount can be provided, and the displaced amount detecting means 31 can figure out the displaced amount by referring the detected torque to the correlation setting means 34.

As in the manner stated above, by providing the correlation setting means 34, the displaced amount can be instantly found from the torque value.

DETAILED DESCRIPTION OF THE PREFERRED EMBODIMENTS

Figure 2:
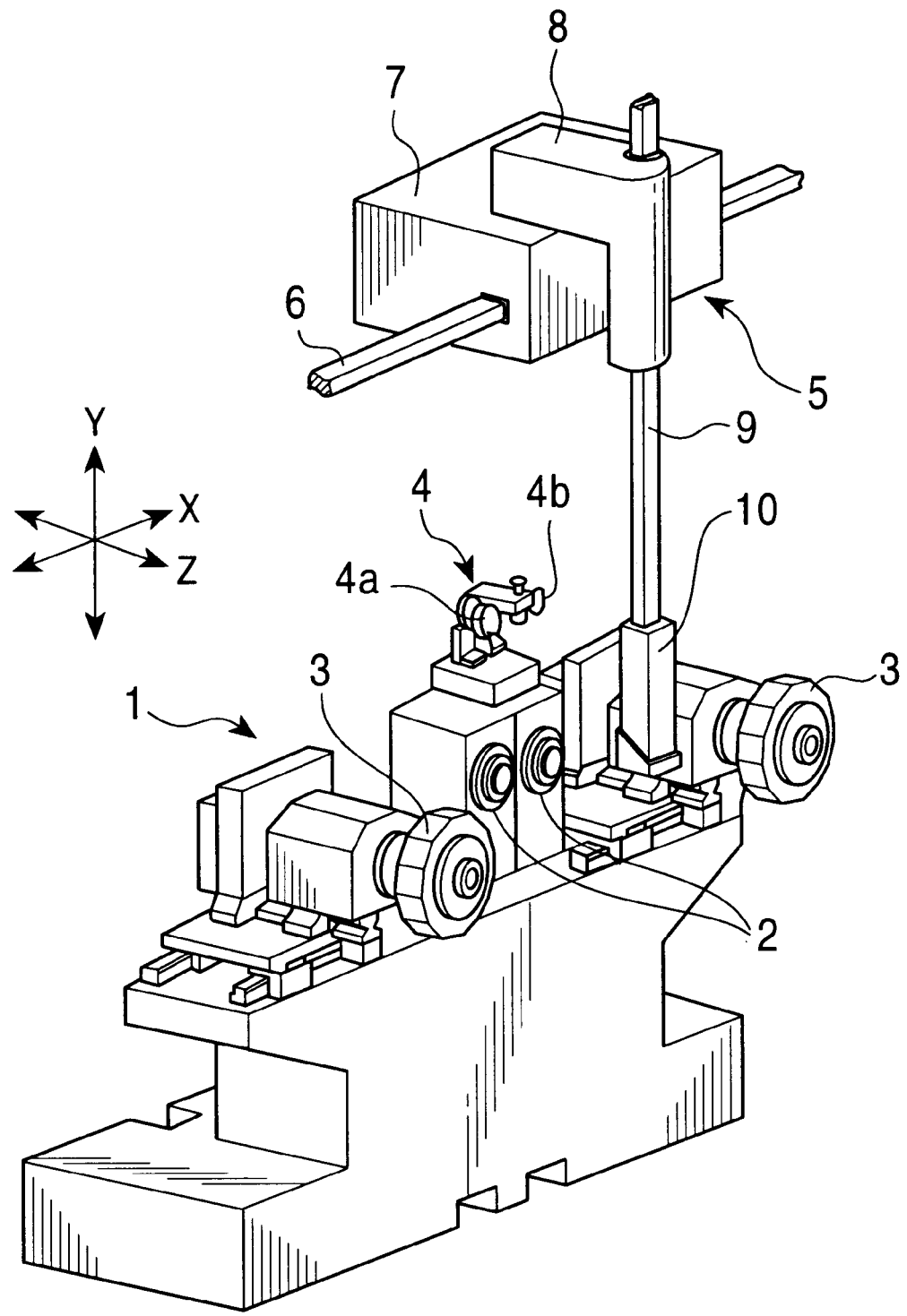
FIG. 2 is a perspective view showing an example of the outer device and the loader.

An embodiment of the present invention will now be described in reference to the accompanying drawings. FIG. 2 is a perspective view showing an example of the machine tool which is the loader and the outer device wherein the present invention is to be applied. An outer device 1 is a lathe of paralleled two spindles typed of a turret form, comprises two pairs of a spindle chuck 2 and a turret tool base 3, and further includes a work reversing device 4. The work reversing device 4 includes two reversing device chucks 4a, 4b, and the work held by one of the revering device chucks 4a can be reversed front and back and then held by the other reversing device chuck 4b. Each reversing device chucks 4a, 4b are located in the upper part of the corresponding spindle chucks 2, 2.

Figure 3:
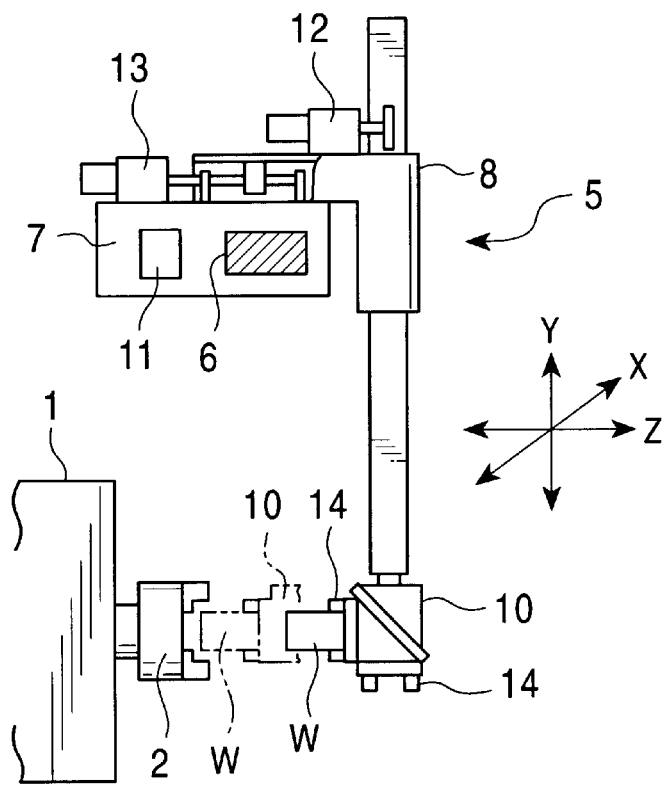
FIG. 3 is a fractural sectional view of the loader of the same.

A loader 5 is a gantry typed, and an elevating and descending rod 9 is provided capable of elevating or descending via a front and back transferring table 8 on a running table 7 running along an installing rail 6, and a loader head 10 is provided in the lower edge of the elevating and descending rod 9. As shown in FIG. 3, two loader chucks 14, 14 are provided facing forward and facing downward to the spindle chuck 2 in the loader head 10, and the position of the chucks 14, 14 are capable of being switched. The running of the running table 7 (transferring in X axis direction), the front and back movement of the front and back transferring table 8 (transferring in Z axis direction), and the elevating and descending of the elevating and descending rod 9 (transferring in Y axis direction) are carried out by the driving of each servomotors 11~13 shown in FIG. 1.

Figure 1:
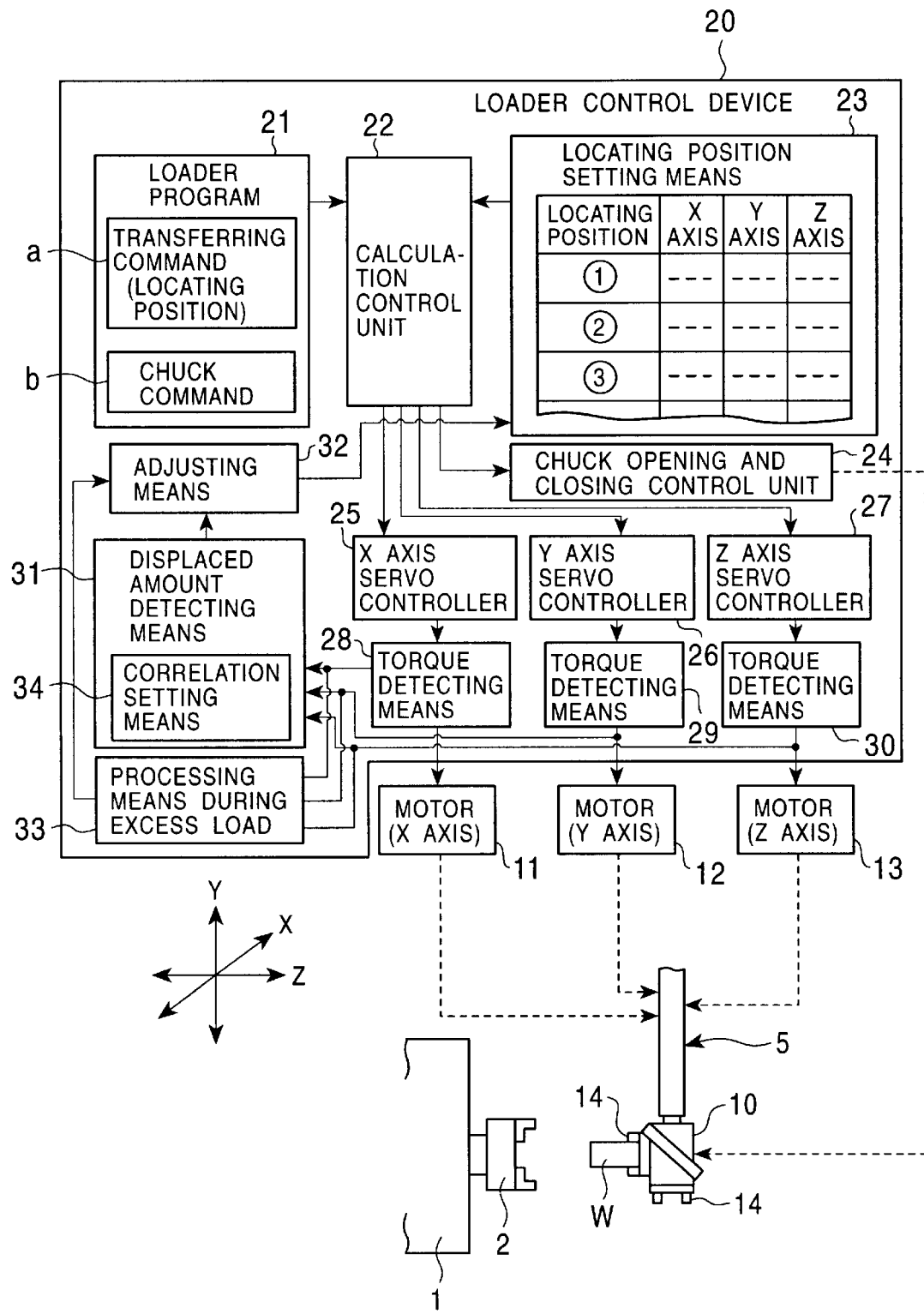
FIG. 1 is a block diagram showing a conception structure of the loader control device according to an embodiment of the present invention.

FIG. 1 is a block diagram of the conception structure of the loader control device. A loader control device 20 is a numerical control typed by the computer, and controls the operation of the loader 5 by carrying out a loader program 21 by a calculation control unit 22 comprised of CPU, memory, or the like. In the loader program 21, various sequence controlling commands or the like, such as a locating command (a) which is an axis transferring command for transferring the loader head 10 to each position, and a chuck command (b) for opening and closing the loader chuck 14 of the loader head 10, are written. The calculation control unit 22 deciphers the loader program 21, and outputs the command corresponding to each transferring command (a) to servo controllers 25~27 of each axis (X~Z axes). Moreover, the calculation control unit 22 forwards to each sequence control unit (not shown in the drawings) of a chuck opening and closing control unit 24 or the like, the sequence control command of such as the chuck command (a) in the loader program 21. The chuck opening and closing control unit 24 is a means for controlling the opening and closing of the loader chuck 14.

The servomotors 11~13 of each of the axes mentioned above are driven by the control of the servo controllers 25~27 of each axis. The servo controllers 25~27 of each axes carry out a position feed back control by the detected signal of the position detector (not shown in the drawings) of a pulse coder or the like provided in the servomotors 11~13. Torque detecting means 28~30 are provided to each of the driving system of the servomotors 11~13 of each axis. These torque detecting means 28~30 are comprised of an ammeter or the like for detecting the current supplied to the servomotors 11~13 of each axis, for example.

According to the embodiment, the locating command (a) of the loader program 21 is to be written in with the identifying code ①, ②, . . . of the locating position, and a locating position setting means 23 for storing the coordinate data of each axis of these locating positions is provided. For example, the locating positions ①, ②, . . . , can be the work delivering position for delivering to the outer device chuck of such as each spindle chuck 14 or the reversing device chuck 4a, 4b (FIG. 2), and the position to deliver to another transporting device (not shown in the drawings) of such as a work feeder or a conveyor from the loader 5, determined to the loader chuck 14.

The coordinate value of each locating positions ①, ②, . . . according to the locating position setting means 23 can be determined by the instruction by an appropriate method.

According to the structure mentioned above, the loader control device 20 of the present embodiment comprises a displaced amount detecting means 31, an adjusting means 32, and a processing means during excess load 33.

Figure 4:
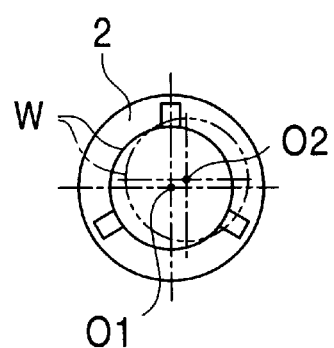
FIG. 4 is a view useful for explaining the displacement of the outer device chuck and the loader chuck.

The displaced amount detecting means 31 is a means for detecting by the torque of the servomotors 11~13 of the loader 2, the displaced amount of the center position (02) (FIG. 4) of the loader chuck 14 and the center position (01) of the chuck 2 of the outer device 1, when the loader chuck 14 is placed on the work delivering position and the work W is delivered to the chuck 2 of the outer device 1. For simplifying the description, only the spindle chuck 2 will be described as the outer device chuck. However, the detection of the displaced amount and each process will be carried out to the reversing device chucks 4a, 4b, in the same manner as to the spindle chuck 2. Moreover, according to this embodiment, it was illustrated to carry out the detection of the displaced amount in three axes directions orthogonal to one another, however, the detection of the displaced amount can be carried out to only the orthogonal two axes direction (X axis, Y axis direction) to the spindle center of the spindle chuck 2.

The displaced amount detecting means 31 includes a correlation setting means 34 which sets the correlation of the motor torque of each axis and the displaced amount, and the displaced amount is figured out by referring to the detected torque with the correlation setting means 34. In the correlation setting means 34, the correlation between the motor torque and the displaced amount are shown with a function or a data table.

The adjusting means 32 is a means for adjusting the work delivering position of the loader chuck 14 by a predetermined amount corresponding to the detected displaced amount when delivering the next work W. Moreover, according to the displaced amount detected by the displaced amount detecting means 31, the coordinate value of the locating positions ①, ②, . . . corresponding to the locating position setting means 23 are adjusted.

The processing means during excess load 33 is a means for stopping the adjusting of the delivering position by the adjusting means 32 in the case the torque of the servomotors 11~13 are larger than the set value. The judgment whether or not the motor torque is larger than the set value, can be carried out by judging directly the torque value, or after converting the motor torque into the displaced value. Moreover, the process to stop the adjusting by the adjusting means 32 can be made not to carry out the adjusting process accordingly, either by stopping the displaced amount from being input to the adjusting means 32, or by stopping the torque value from being input into the displaced amount detecting means 31. When the torque is larger than the set value, an alarm can be generated from the processing means during excess load 33.

The operation of the structure described above will be explained next. The loader 5 is transferred by the control of the loader control device 20 to the locating position ①, ②, . . . determined beforehand by the instruction, and the position is fixed thereon. In each locating position ①, ②, . . . , the work W is delivered between the loader chuck 5 and the chuck 2, 4a, 4b of the other device 1. At the time being, the displaced amount detecting means 31 detects the displaced amount of the center position (02) (FIG. 4) of the loader chuck 14 and the center position (01) of the outer device chuck 2, from the torque of each servomotors 11~13 when the loader chuck 14 becomes under a restricted state by being held by both the outer device chuck 2 and the loader chuck 13. The adjusting means 32 adjusts this displaced amount to the coordinate data of the locating position ①, ②, . . . which corresponds to the locating position setting means 23. Therefore, the position is fixed to the adjusted coordinate value from the next time.

For example, as shown with chained line in FIG. 3, when the work W is held by both the spindle chuck 2 and the loader chuck 14, in the case the position of the loader chuck 14 is not fixed to an appropriate position, the torque in the X axis or Y axis direction is to become high. Since the direction of the torque can be known by +/−, it can be easily known to which side an excessive force is applying. According to this value and the direction, the locating is carried out by displacing the locating position by a determined amount in the next cycle. In the case a rather large torque is generated in the next cycle, the locating position is displaced even more. By carrying out this control by each cycle, the delivery can be carried out at an appropriate locating constantly.

In the case mentioned above, since the correlation setting means 34 which has made the correlation between the size and the displaced amount of the generating torque into a function or a data table beforehand is provided, the process to determine the displacement can be carried out instantly by the torque detection.

In the case the motor torque is excessive, it can be assumed that some abnormality has occurred, in that the tolerance level has been exceeded. In such case, the adjustment of the delivering position by the adjusting means 32 is stopped by the processing means during excess load 33. As a result, the abnormality can be prevented from being reflected on the next processing as the adjusting of the work delivering position when an abnormality generates.

Figure 5:
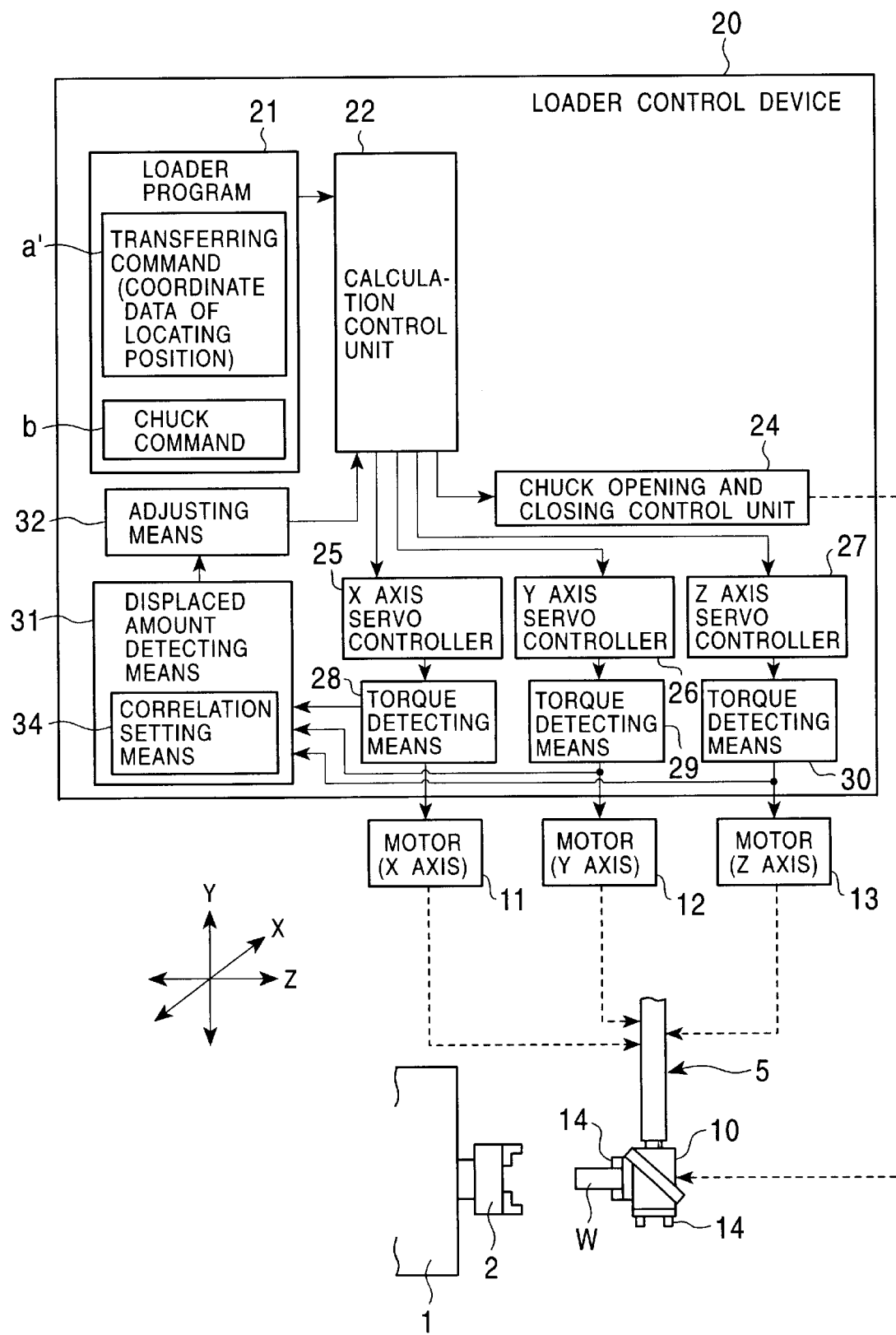
FIG. 5 is a block diagram showing a conception structure of the loader control device according to other embodiment of the present invention.

Further, according to aforementioned embodiment, a locating position setting means 23 was provided. However, as shown in FIG. 5, the coordinate value of the locating position can be written in a transferring command (a') of the loader program 21, without providing this locating position setting means 23. In such case, for example, the adjusting means 32 is to revise the coordinate value of the transferring command (a') at the stage to carry out the transferring command (a') of the loader program 21 by the calculation control unit 22.

The loader control device of the present invention is a loader control device for controlling the loader delivering a work to the chuck of the outer device, and comprises a displaced amount detecting means and an adjusting means.

The displaced amount detecting means detects by the torque of the motor of the loader, the displacement of the center position of the loader chuck and the center position of the chuck of the outer device, when a work is delivered with the loader chuck placed on the work delivering position. The adjusting means adjusts the work delivering position of the loader chuck so that the detected displaced amount is to be resolved when delivering the next work. Therefore, when delivering a work to the chuck of the outer device, the generation of abnormal operations of the loader or the delivering failure due to the displacement in the core of the chuck can be prevented.

The loader is operated by the coordinate data of the work delivering position specified by the loader program, and when adjusting the work delivering position by either rewriting the coordinate data or adding the revised amount, based on the displaced amount, the adjusting of the work delivering position can be carried out easily by just changing the coordinates.

When the torque of the motor is larger than the set value, in the case a processing means during excess load for stopping the adjusting of the delivering position by the adjusting means is provided, when an abnormality generates, the abnormality is to be prevented from being reflected on the next processing as the adjusting of the work delivering position.

What is claimed is:

1. A loader control device for controlling a loader to deliver a work to a chuck of an outer device along a X, Y and Z axes in a three dimension space, comprising:
   a displaced amount detecting means for detecting by a torque of a plurality of motors of a loader, a displacement along the X, Y and Z axes of the three dimension space between a center position of a loader chuck and a center position of an outer device chuck when the loader chuck is placed on a work delivering position and the work is delivered; and
   an adjusting means for adjusting the work delivering position of the loader chuck along the X, Y and Z axes of the three dimension space by an amount corresponding to the detected displaced amount when delivering a next work.

2. A loader control device according to claim 1 wherein the loader operates by coordinate data of the work delivering position specified by a loader program, and based on the displaced amount, by rewriting the coordinated data or adding a revising amount, so as to adjust the work delivering position.

3. A loader control device according to claim 1 or claim 2 comprising:

during excessive load, a processing means for stopping adjusting the delivering position by the adjusting means when torque of the plurality of motors is larger than a set value.

* * * * *